Figure 1:
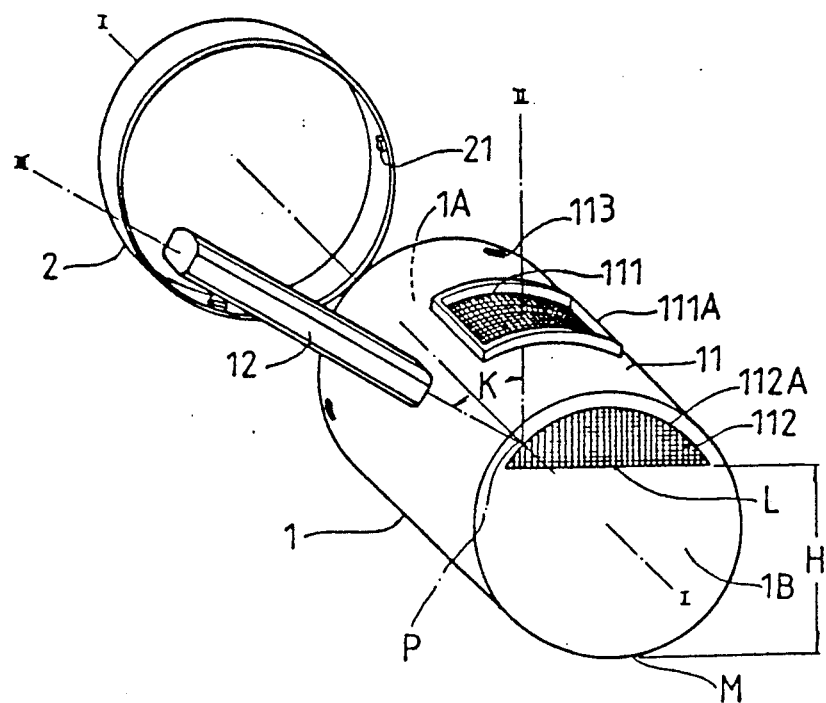

United States Patent [19]

Hsu

[11] Patent Number: 5,044,387

[45] Date of Patent: Sep. 3, 1991

[54] EDIBLE GRAIN WASHER

[76] Inventor: Yung C. Hsu, 4th Fl., No. 12, Lane 251, Tsun Hsien Street, Taipei, Taiwan

[21] Appl. No.: 545,785

[22] Filed: Jun. 29, 1990

[51] Int. Cl.⁵ .............................................. B08B 3/02
[52] U.S. Cl. .................................... 134/198; 210/244; 210/464; 210/470
[58] Field of Search ................... 134/25.3, 104.3, 117, 134/182, 183, 198, 201; 366/130; 99/295, 306, 536; 210/244, 464, 465, 470; 220/601, 661, 676; 137/268; 4/290, 652, 654; 222/189, 565; 209/235, 372, 417; 422/266, 274, 276, 277; 68/213; 206/0.5

[56] References Cited

U.S. PATENT DOCUMENTS

| | | | |
|---|---|---|---|
| 1,388,136 | 8/1921 | Whitney | 422/274 |
| 1,641,051 | 8/1927 | Rheney | 222/189 |
| 3,510,108 | 5/1970 | Yego, Jr. | 134/200 X |
| 4,756,323 | 7/1988 | Horton | 134/201 X |

FOREIGN PATENT DOCUMENTS 124783  7/1947  Australia ............................ 422/266

Primary Examiner—Philip R. Coe

[57] ABSTRACT

An edible grain washer has a hollow body provided with an open side and a closed opposite side. A water inlet port having a screen is provided in an upper side of the hollow body, and a water inlet port having a screen is provided in an upper part of the closed opposite side of the hollow body. A cover is provided to detachably cover the open side of the hollow body, which also has a handle extending from a rear side of the hollow body. The edible grain washer of this invention is convenient for use in homes.

2 Claims, 1 Drawing Sheet

EDIBLE GRAIN WASHER

BACKGROUND OF THE INVENTION

The present invention relates to a washer, more particularly to an edible grain washer.

Cereals, e.g. rice or beans, need to be washed before being cooked. Rice or beans have been traditionally washed by hand. Such a hand washing process is uncomfortable and also tedious as one has to repeatedly use one's hand to stir the cereal in the water and to pour off excess washing water without allowing the cereal to flow out of the cooker with the excess water. In order to deal with this situation, an electrical washer has been developed, which conventionally involves a motor, a reduction unit, a stirring member, a washing bowl, a water inlet member, a water outlet member, etc.; the electric washer, however, suffers from the following disadvantages: (1) it occupys a part of the kitchen space; (2) it is troublesome to connect the water inlet and outlet tubes; (3) it is not easy to get all of the washed cereal grains out of the washer since the wet grains easily adhere to the stirring member and the wall of the washing bowl; (4) the washer itself is complicated in structure; and (5) it is power-consuming.

A pressurized washer has also been proposed, which includes a washing bowl having a conical bottom, a water inlet tube, a bottom water-jetting tube, a water outlet tube and a switch valve; the pressurized washer suffers from the following disadvantages: (1) it requires a water supply source with a relatively high pressure; (2) it is water-consuming; (3) it is troublesome to connect the water inlet and outlet tubes; (4) it occupys space on the kitchen cabinet; (5) it gets clogged easily and frequently fails to work effectively; and (6) it is troublesome to remove all the cereal grains from the washer.

The above two types of washers have not therefore been commonly adopted in homes.

SUMMARY OF THE INVENTION

It is an object of the present invention to provide a non-electrical edible grain washer that does not require the cereal grains to be stirred in the water by the hand of the one who is cooking the cereal grains.

It is a further object of the present invention to provide a non-electrical edible grain washer that prevents the cereal grains from flowing out of the washer while they are being washed therein.

It is still another object of the present invention to provide a non-electrical edible grain washer that has an end opening that allows the cereal grains to be easily put into and removed from the washer.

It is yet an object of the present invention to provide an edible cereal grain washer that has a simplified structure and is capable of being conveniently operated and stored.

According to the present invention, the edible grain washer includes a hollow body having an open side and a closed opposite side, a cover for detachably covering the open side of the hollow body, and a handle extending from a rear side of the hollow body. The hollow body is provided with a water inlet port on the upper side thereof, the water inlet port being provided with a screen to prevent the edible grains from escaping from the washer with the washing water. The closed side of the hollow body has a water outlet port provided with a screen capable of preventing the edible grains from spilling therefrom when the washing water leaves the hollow body.

Figure 2:
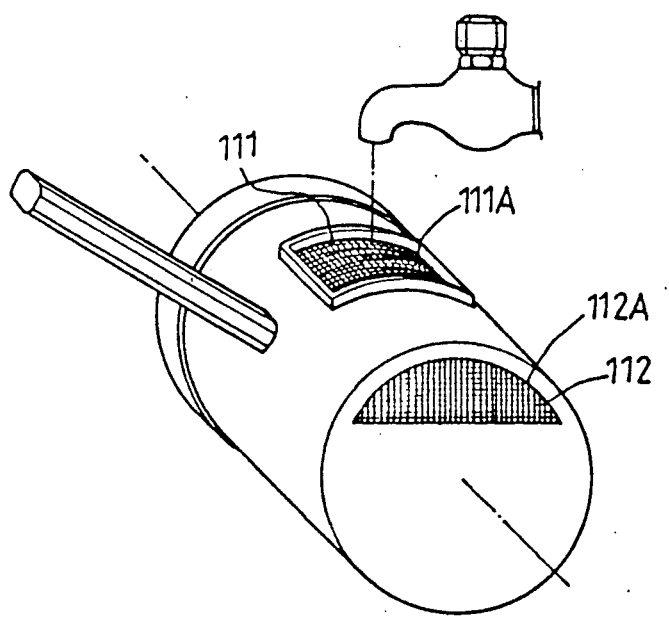

The present invention may best be understood through the following description with reference to the accompanying drawings, in which:

FIG. 1 is a perspective exploded view of a preferred embodiment of the edible grain washer according to the present invention; and FIG. 2 is a perspective schematic view showing the edible grain washer of FIG. 1 in use.

Referring now to FIGS. 1 and 2, a preferred embodiment of the edible grain washer according to the present invention includes a hollow body 1 having an open side 1A and a closed side (herein after as closed side) 1B opposite to the open side 1A, a cover 2 capable of detachably covering the open side 1A of hollow body 1, and a handle 12 provided at a rear side of hollow body 1. Hollow body 1 is preferably a cylindrical container having a horizontal axis I—I defined in a central portion in the hollow body 1 passing through the central portions of the open side 1A and the closed side 1B; however, it may be alternatively a container having a cross section of rectangular or oval shape having a similar horizontal axis I—I.

On an upper side 11 of hollow body 1 is formed a water inlet port 111A provided with a wire-meshed screen 111 capable of allowing water to pass through, but precluding an outward releasing of rice or beans from the hollow body 1.

Closed side 1b is provided with a water outlet port 112A having wire-meshed screen 112 similar to wire-meshed screen 111, water outlet port 112A being formed at the upper part of closed side 1B and having a lower edge disposed above the bottom M of hollow body 1 a height H, which is preferably above the central part of closed side 1B.

Hollow body 1 has a vertical axis II—P vertically defined in a central portion of the hollow body which passes through the central part of water inlet port 111A and crosses with horizontal axis I—I at point P. Handle 12 is so provided to extend from a rear side of hollow body 1 in a direction less than 90 degrees with a vertical axis II—P of hollow body 1, and has a longitudinal axis III—P which perpendiculary intersects the horizontal axis I—I at point P, to form an acute angle K with vertical axis II—P; the angle K is less than 90 degrees.

Cover 2 is provided with a catch 21 adapted to be datachably engaged with another catch 113 provided on hollow body 1.

To use the edible grain washer of this invention, cover 2 is first removed from hollow body 1, and than hollow body 1 is turned open side 1A up. A suitable quantity of grains, such as rice or beans, is placed in hollow body 1 through open side 1A. Cover 2 is then placed over open side 1A to close open side 1A.

Then hollow container 1 is turned back to the horizontal position, and water is poured into hollow body 1 through water inlet port 111A, as shown in FIG. 2. The user may grip handle 12 and shake hollow body 1 vigorously while water is being poured into hollow body 1 or after an appropriate amount of water has been poured in. During the shaking process the rice or beans in hollow body 1 are washed, while water outlet port 112A allows excess water to spill from hollow body 1 without the grains to be lost with the spilled excess water.

As soon as the grain has been washed properly, hollow body 1 is again turned upright with covered open side 1A up. Cover 2 is removed and the grain is then poured into a cooker. The grains are ready to be cooked, and the grain washer is ready to wash another batch of grains.

Wire-meshed screens 111 and 112 may be of metallic material or plastic; they may also be replaced with a woven or non woven fabric.

Cover 2 may be provided with an elastic seal to provide a water-tight fit with open side 1A of hollow body 1.

What is claimed is:

1. An edible grain washer comprising:
   a hollow body including a horizontal axis horizontally defined in a central portion in said hollow body, an open side formed on a first side of said hollow body, a closed side formed on a second side of said hollow body opposite to said open side, said horizontal axis of said hollow body passing through a central portion of said open side and through another central portion of said closed side, a water inlet port formed in an upper side of said hollow body and secured with a first screen means on said water inlet port for passing water through said first screen means for precluding an outward releasing of grains filled in said body, and a water outlet port formed in said closed side and secured with a second screen means on said outlet port for filtering off washed water and preventing releasing of the grains filled in the body;
   a cover detachably secured on said open side of said hollow body; and
   a handle extending rearwardly from said hollow body along a longitudinal axis of said handle, said longitudinal axis of said handle defining an acute angle with a vertical axis which is vertically formed in a central portion of said hollow body perpendicularly intersecting said horizontal axis of said hollow body, said handle being operatively rotated about said longitudinal axis of said handle for turning said open side upwardly for filling grains to be washed into said body through said open side upon a removal of said cover, and said hollow body covered with said cover being operatively reciprocated by gripping said handle for washing the grains filled in said body when pouring water into said body through said water inlet port and said first screen means.

2. An edible grain washer according to claim 1, wherein said water outlet port has a lower edge positioned above a central portion of said closed side of said hollow body.

* * * * *